US 9,888,184 B2

(12) United States Patent
Miyazaki

(10) Patent No.: US 9,888,184 B2
(45) Date of Patent: Feb. 6, 2018

(54) LIGHT EMISSION CONTROL DEVICE, CONTROL METHOD THEREFOR, STORAGE MEDIUM STORING CONTROL PROGRAM THEREFOR, AND IMAGE PICKUP APPARATUS WITH LIGHT EMISSION CONTROL DEVICE

(71) Applicant: CANON KABUSHIKI KAISHA, Tokyo (JP)

(72) Inventor: Yasuyoshi Miyazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 15/007,638

(22) Filed: Jan. 27, 2016

(65) Prior Publication Data

US 2016/0219206 A1 Jul. 28, 2016

(30) Foreign Application Priority Data

Jan. 28, 2015 (JP) ................................. 2015-014172

(51) Int. Cl.
*H04N 5/235* (2006.01)

(52) U.S. Cl.
CPC ......... *H04N 5/2351* (2013.01); *H04N 5/2352* (2013.01)

(58) Field of Classification Search
CPC ........................... H04N 5/2351; H04N 5/2352
See application file for complete search history.

(56) References Cited

U.S. PATENT DOCUMENTS

2013/0293745 A1* 11/2013 Tamura ............... H04N 5/2351
348/234

FOREIGN PATENT DOCUMENTS

JP 2014098859 A 5/2014

* cited by examiner

*Primary Examiner* — Christopher K Peterson
(74) *Attorney, Agent, or Firm* — Rossi, Kimms & McDowell LLP

(57) ABSTRACT

A light emission control device that is capable of controlling an emission amount of a light emitting unit irrespective of existence of a high-intensity light source. A selecting unit divides each of a non-emission image and a pre-emission image into a predetermined number of block areas, and selects a light-control target area according to a difference between luminance values in the non-emission image and the pre-emission image. A first weighting unit generates first weighting data by allocating a predetermined weight to each the light-control target area. A second weighting unit finds a weighting coefficient for each the light-control target area in the non-emission image, and to generate second weighting data by multiplying the first weighting data by the weighting coefficient. A control unit controls the emission unit according to a main emission amount that makes the light-control target area be proper exposure with reference to the second weighting data.

9 Claims, 8 Drawing Sheets

*FIG. 4A*
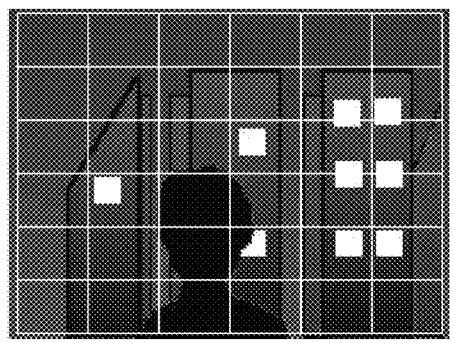
*FIG. 4C*
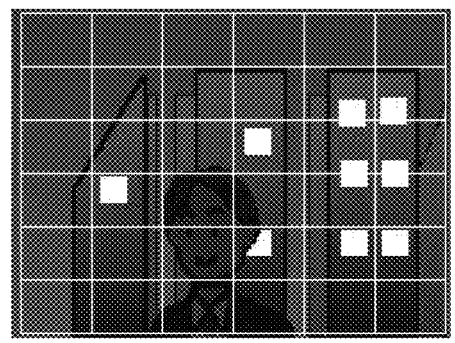
*FIG. 4B*
| 56 | 56 | 56 | 56 | 56 | 56 |
|---|---|---|---|---|---|
| 59 | 53 | 58 | 59 | 79 | 80 |
| 63 | 54 | 60 | 96 | 87 | 82 |
| 61 | 89 | 5 | 44 | 78 | 79 |
| 62 | 43 | 10 | 198 | 83 | 86 |
| 62 | 30 | 12 | 31 | 32 | 38 |
*FIG. 4D*
| 56 | 56 | 56 | 56 | 56 | 56 |
|---|---|---|---|---|---|
| 59 | 53 | 58 | 59 | 79 | 80 |
| 63 | 54 | 60 | 96 | 87 | 82 |
| 61 | 89 | 27 | 46 | 78 | 79 |
| 62 | 43 | 39 | 200 | 83 | 86 |
| 62 | 30 | 26 | 32 | 32 | 38 |
*FIG. 4E*
| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 22 | 2 | 0 | 0 |
| 0 | 0 | 29 | 2 | 0 | 0 |
| 0 | 0 | 14 | 1 | 0 | 0 |
*FIG. 5A*
| 2 | 8 | 10 | 10 | 8 | 2 |
|---|---|---|---|---|---|
| 5 | 15 | 20 | 20 | 15 | 5 |
| 10 | 20 | 30 | 30 | 20 | 10 |
| 10 | 20 | 30 | 30 | 20 | 10 |
| 5 | 15 | 20 | 20 | 15 | 5 |
| 2 | 8 | 10 | 10 | 8 | 2 |
*FIG. 5B*
| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 30 | 30 | 0 | 0 |
| 0 | 0 | 20 | 20 | 0 | 0 |
| 0 | 0 | 10 | 10 | 0 | 0 |

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 30 | 30 | 0 | 0 |
| 0 | 0 | 20 | 20 | 0 | 0 |
| 0 | 0 | 10 | 10 | 0 | 0 |

| 56 | 56 | 56 | 56 | 56 | 56 |
|---|---|---|---|---|---|
| 59 | 53 | 58 | 59 | 79 | 80 |
| 63 | 54 | 60 | 96 | 87 | 82 |
| 61 | 89 | 5 | 44 | 78 | 79 |
| 62 | 43 | 10 | 198 | 83 | 86 |
| 62 | 30 | 12 | 31 | 32 | 38 |

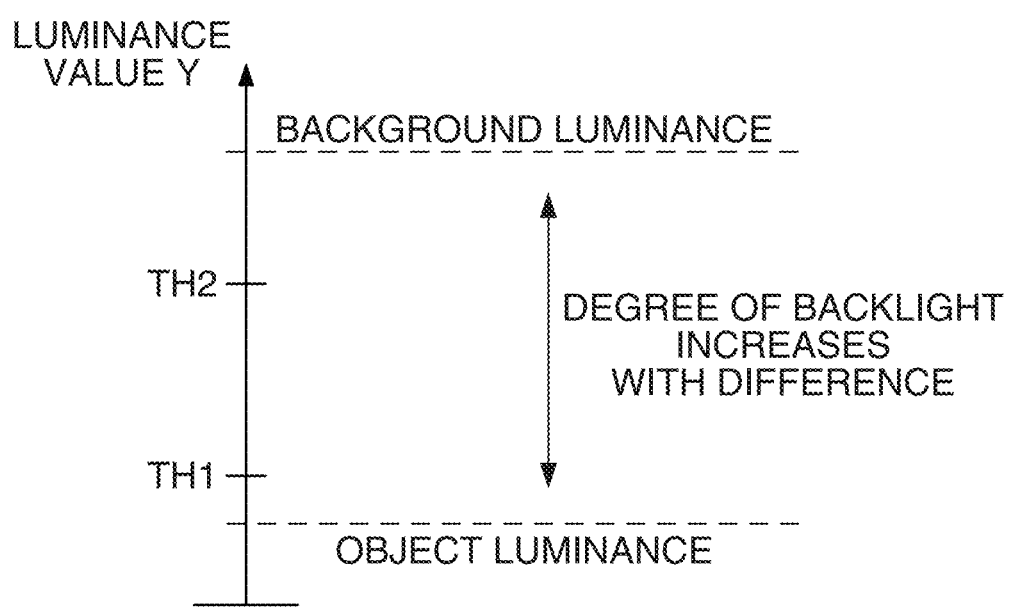

LIGHT EMISSION CONTROL DEVICE, CONTROL METHOD THEREFOR, STORAGE MEDIUM STORING CONTROL PROGRAM THEREFOR, AND IMAGE PICKUP APPARATUS WITH LIGHT EMISSION CONTROL DEVICE

BACKGROUND OF THE INVENTION

Field of the Invention

The present invention relates to a light emission control device, a control method therefor, a storage medium storing a control program therefor, and an image pickup apparatus with the light emission control device, and in particular, relates to emission control for controlling a light emission unit to emit light in an image pickup apparatus.

Description of the Related Art

There is a known pre-emission system that performs pre-emission prior to main emission as an emission control performed when photographing with emitting a light emitting unit of a lighting device or a light emitting unit (referred to as an electric flash) of an image pickup apparatus. In the pre-emission system, an image pickup apparatus obtains an image by photographing an object without emitting the electric flash first (the image is referred to as a non-emission image).

Next, the image pickup apparatus obtains an image by photographing the object with performing pre-emission of the electric flash (the image is referred to as a pre-emission image). Then, a reflected light component (referred to as reflected light data) is found based on a difference between the non-emission image and the pre-emission image. Then, an emission amount of a main photographing (a main emission amount) is obtained according to the reflected light data concerned. And the image pickup apparatus photographs with performing main emission of the electric flash according to the main emission amount concerned.

For example, a block integration value is generated as the reflected light data by integrating luminance values in image areas (blocks) of each of the non-emission image and the pre-emission image. Then, an object weight is obtained for an object area according to the luminance difference between the block integration values, and the emission amount that makes the object be proper luminance is calculated in consideration of external light at the time of the non-emission photography.

When the main emission amount is found in such a manner, the emission amount corresponding to brightness of an object is found wherever the object is positioned within a range to which the pre-emission light reaches in the image (see Japanese Laid-Open Patent Publication (Kokai) No. 2014-98859 (JP 2014-98859A)).

However, when there is a strong light source like a neon lamp (referred to as a high-intensity light source) beside an object, the object and the high-intensity light may be included in the same block depending on a photographing field angle. In such a case, the brightness of the object is determined to be brighter than the actual condition, and the main emission amount is estimated less. As a result, the object becomes dark in the image.

Although it is possible to increase the number of block partitions in an image to reduce an effect of a high-intensity light source, a calculating amount becomes huger as the number of block partitions increases.

SUMMARY OF THE INVENTION

The present invention provides a light emission control device, a control method therefor, a storage medium storing a control program therefor, and an image pickup apparatus equipped with the light emission control device, which are capable of controlling an emission amount of a light emitting unit irrespective of existence of a high-intensity light source.

Accordingly, a first aspect of the present invention provides a light emission control device comprising a selecting unit configured to divide each of a non-emission image obtained by photographing an object without making an emission unit emit light and a pre-emission image obtained by photographing the object with making the emission unit emit light by a predetermined light amount into a predetermined number of block areas, and to select at least one block area that is subjected to light control in the non-emission image as at least one light-control target area according to a difference between a luminance value of a block area in the non-emission image and a luminance value of a corresponding block area in the pre-emission image, a first weighting unit configured to generate first weighting data by allocating a predetermined weight to each the at least one light-control target area, a second weighting unit configured to find a weighting coefficient for each the at least one light-control target area in the non-emission image, and to generate second weighting data by multiplying the first weighting data by the weighting coefficient, and a control unit configured to control the emission unit according to a main emission amount that makes the at least one light-control target area be proper exposure with reference to the second weighting data.

Accordingly, a second aspect of the present invention provides an image pickup apparatus comprising an image pickup unit configured to photograph an object to obtain an image, the light emission control device of the first aspect, and a recording unit configured to record an image, which is obtained by photographing the object with said image pickup unit with making the emission unit emit light by the main emission amount, into a storage medium.

Accordingly, a third aspect of the present invention provides a light emission control device that controls an emission amount of an emission unit, the light emission control device comprising a photometry unit configured to obtain photometry values of a plurality of photometry areas, a selection unit configured to select a plurality of target areas used when determining the emission amount of the emission unit from among the plurality of photometry areas, a determination unit configured to determine the emission amount of the emission unit based on a result of a weighting operation using the photometry values of the plurality of target areas obtained by said photometry unit without making the emission unit emit light, and a setting unit configured to set up weights used for the weighting operation to the plurality of target areas according to the photometry values of the plurality of target areas obtained by said photometry unit without making the emission unit emit light.

Accordingly, a fourth aspect of the present invention provides a control method for a light emission control device, the control method comprising a selecting step of dividing each of a non-emission image obtained by photographing an object without making an emission unit emit light and a pre-emission image obtained by photographing the object with making the emission unit emit light by a predetermined light amount into a predetermined number of block areas, and of selecting at least one block area that is subjected to light control in the non-emission image as at least one light-control target area according to a difference between a luminance value of a block area in the non-emission image and a luminance value of a corresponding block area in the pre-emission image, a first weighting step of generating first weighting data by allocating a predetermined weight to each the block area included in the light-control target area, a second weighting step of finding a weighting coefficient for each the block area included in the light-control target area in the non-emission image, and of generating second weighting data by multiplying the first weighting data by the weighting coefficient, and a control step of controlling the emission unit according to a main emission amount that makes the light-control target area be proper exposure with reference to the second weighting data.

Accordingly, a fifth aspect of the present invention provides a control method for a light emission control device that controls an emission amount of an emission unit, the control method comprising a photometry step of obtaining photometry values of a plurality of photometry areas; a selection step of selecting a plurality of target areas used when determining the emission amount of the emission unit from among the plurality of photometry areas, a determination step of determining the emission amount of the emission unit based on a result of a weighting operation using the photometry values of the plurality of target areas obtained in said photometry step without making the emission unit emit light, and a setting step of setting up weights used for the weighting operation to the plurality of target areas according to the photometry values of the plurality of target areas obtained in said photometry step without making the emission unit emit light.

Accordingly, a sixth aspect of the present invention provides a non-transitory computer-readable storage medium storing a control program causing a computer to execute the control method of the fourth aspect.

Accordingly, a seventh aspect of the present invention provides a non-transitory computer-readable storage medium storing a control program causing a computer to execute the control method of the fifth aspect.

According to the invention, the emission amount of the light emitting unit is controlled irrespective of existence of a high-intensity light source.

Further features of the present invention will become apparent from the following description of exemplary embodiments with reference to the attached drawings.

BRIEF DESCRIPTION OF THE DRAWINGS

FIG. 4A through FIG. 4E are views for describing a method for calculating a reflective luminance value that is reflected light data of the pre-emission performed with the camera shown in FIG. 1. FIG. 4A is a view showing an example of a non-emission image, FIG. 4B is a view showing luminance values of block areas in the non-emission image, FIG. 4C is a view showing an example of a pre-emission image, FIG. 4D is a view showing luminance values of the block areas in the pre-emission image, and FIG. 4E is a view showing reflective luminance values obtained by light emission.

FIG. 5A and FIG. 5B are views for describing how to generate object weight data performed with the camera shown in FIG. 1. FIG. 5A is a view showing centrally weighted weights, and FIG. 5B is a view showing object weights.

FIG. 8A is a graph showing an example of distribution of the luminance values in the non-emission image. FIG. 8B is a graph showing a relation between a luminance value and a weighting factor.

FIG. 10 is a view for describing a backlight-scene determination process performed with the camera shown in FIG. 1.

DESCRIPTION OF THE EMBODIMENTS

Hereafter, an example of a light emission control device according to an embodiment of the present invention will be described with reference to the attached drawings.

Figure 1:
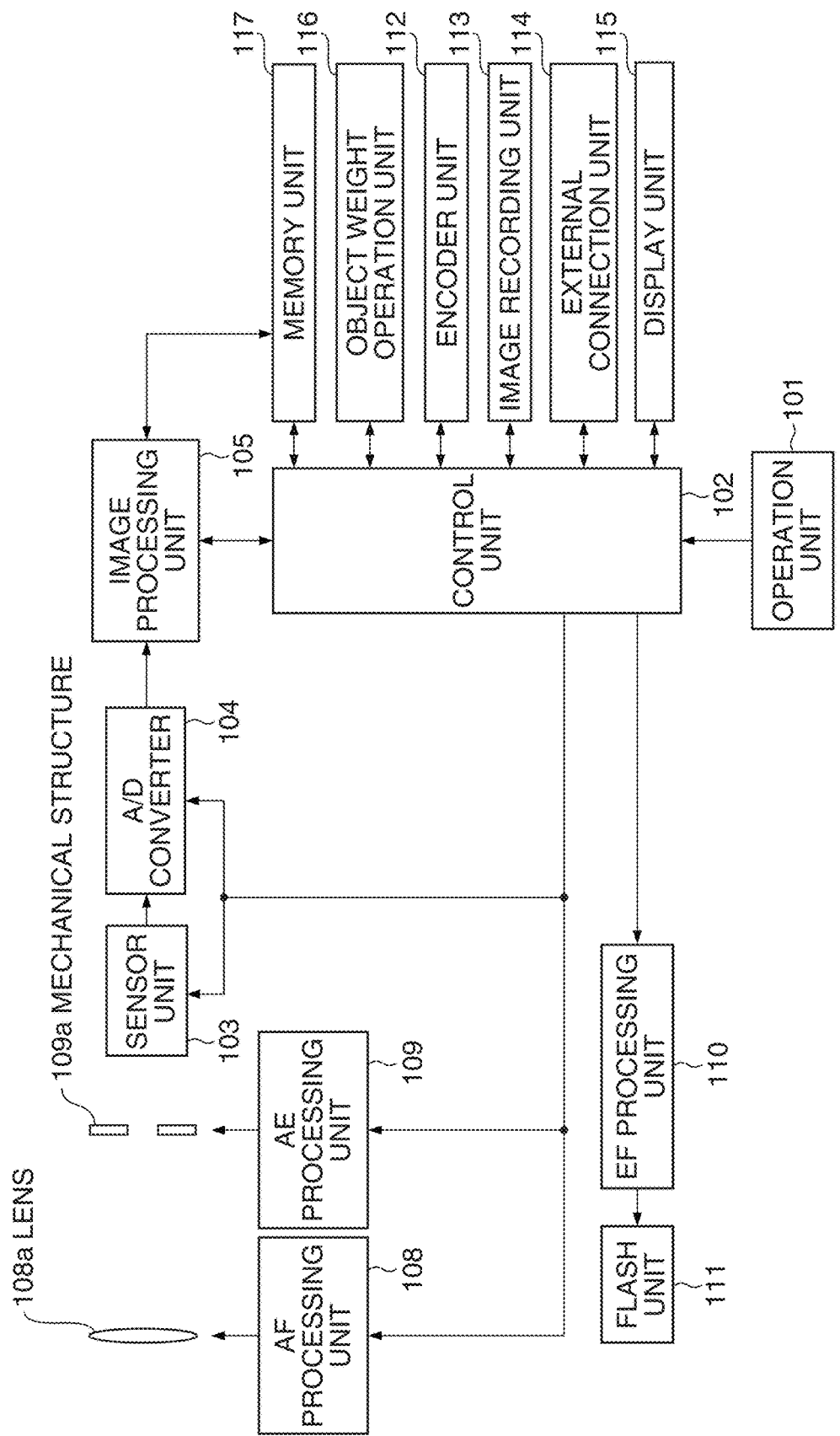
FIG. 1 is a block diagram schematically showing an example of an image pickup apparatus (camera) equipped with a light emission control device according to an embodiment of the present invention.

FIG. 1 is a block diagram schematically showing an example of an image pickup apparatus equipped with a light emission control device according to the embodiment of the present invention.

The illustrated image pickup apparatus is a digital camera (hereinafter referred to as a camera), for example, and has a photographing lens unit (hereinafter referred to as a lens) 108a and an exposure mechanism (a mechanical structure) 109a. A sensor unit 103 has an image pickup device, such as a CCD or CMOS sensor, and receives an optical image (object image) through the lens 108a and the mechanical structure 109a. Then, the sensor unit 103 outputs an electrical signal (an analog image signal) corresponding to the optical image.

An A/D convertor 104 applies a sampling process, a gain adjustment process, an A/D conversion process, etc. to the analog image signal that is output from the sensor module 103, and outputs a digital image signal. An image processing unit 105 applies a predetermined image process to the digital image signal that is output from the A/D convertor 104, and outputs image data. For example, the image processing unit 105 converts the digital image signal into a YUV image signal, and outputs it as image data. Then, the image data is stored into a memory unit 117.

An operation unit 101 is provided with switches, buttons, etc. for a user to input various instructions to the camera. Then, the operation unit 101 includes a shutter switch and a touch sensor (a sensor for detecting a touch operation on a display device). A control unit 102 controls the entire camera, and controls the camera according to instructions through the operation unit 101, for example.

It should be noted that the control unit 102 computes the luminance values of an image on the basis of the image data that is output from the image processing unit 105. Moreover, the control unit 102 displays the image according to the image data on the display unit 115. The display unit 115 is a liquid crystal panel, for example.

An AF processing unit 108 drivingly controls the lens 108a along with an optical axis under the control of the control unit 102 to focus on an object. An AE processing unit 109 drivingly controls the mechanical structure 109a according to a difference between a luminance value of an image and a target luminance value under the control of the control unit 102. An EF processing unit 110 makes a flash unit 111 (a light emission unit) emit light under the control of the control unit 102. Then, an object is illuminated.

Figure 2A:
FIG. 2A is a view showing an example of a non-emission image obtained with the camera shown in FIG. 1.
Figure 2B:
FIG. 2B is a view showing an example of a pre-emission image obtained with the camera shown in FIG. 1.
Figure 2C:
FIG. 2C is a view showing an example of a main emission image obtained with the camera shown in FIG. 1.

FIG. 2A is a view showing an example of a non-emission image obtained with the camera shown in FIG. 1. FIG. 2B is a view showing an example of a pre-emission image obtained with the camera shown in FIG. 1. Moreover, FIG. 2C is a view showing an example of a main emission image obtained with the camera shown in FIG. 1.

The non-emission image shown in FIG. 2A is obtained by photographing an object without making the flash unit 111 emit light. Then, an emission control is performed when photographing with making the flash unit 111 emit light. In this case, the pre-emission image (see FIG. 2B) is obtained by photographing with making the flash unit 111 pre-emit by a predetermined light amount before a main emission of the flash unit 111. Then, the control unit 102 obtains an emission amount for a main photographing (main emission amount) according to the difference between the luminance values of the non-emission image and the pre-emission image. Next, the control unit 102 controls the EF processing unit 110 to photograph with making the flash unit 111 emit light according to the main emission amount.

An object weight operation unit 116 generates object weight data that shows a weight of an object under the control of the control unit 102 according to the pre-emission image obtained by the pre-emission and the non-emission image.

When generating the object weight data, the object weight operation unit 116 divides each of the non-emission image and the pre-emission image into the predetermined number of block areas, and obtains an integrated luminance value for each of the block areas by integrating luminance values of pixels in each area. In the following description, a block area in a non-emission image is referred to as a non-emission block, and a block area in a pre-emission image is referred to as a pre-emission block.

Then, the object weight operation unit 116 finds a luminance difference between a non-emission block and a pre-emission block as mention later, and finds block areas in which an object exists according to the luminance difference concerned. The object weight operation unit 116 generates object weight data about positions equivalent to the block areas (existing areas) in which the object exists, which is used in a light control operation, according to default weights beforehand distributed in a centrally weighted manner. It should be noted that the default weights is not necessarily distributed in the centrally weighted manner. The default weights may be flat over the whole areas, or may be distributed in a weighted manner with reference to a position that is selected by a user through the operation unit 101.

An encoder unit 112 converts a format of image data into a predetermined format like JPEG under the control of the control unit 102, and outputs the converted data as compressed image data to an image recording unit 113. The image recording unit 113 records the above-mentioned compressed image data into a memory (storage medium: not shown) built in the camera or an external memory (not shown) inserted in the camera.

It should be noted that the camera is connectable with external devices, such as a PC, through an external connection unit 114.

When photographing with the camera shown in FIG. 1, a user turns ON a power switch of the operation unit 101. The control unit 102 supplies electric power to the camera when the power switch is turned ON. When the electric power is supplied to the camera, the AE processing unit 109 opens a shutter of the mechanical structure 109a under the control of the control unit 102. This allows light to be incident on the sensor module 103 through the lens 108a and the mechanical structure 109b. The control unit 102 reads the electric charge accumulated in the sensor module 103, and outputs it as an analog image signal to the A/D convertor 104.

The A/D convertor 104 applies a sampling process, a gain adjustment process, an A/D conversion process, etc. to the analog image signal as mentioned above, and outputs a digital image signal. Then, the image processing unit 105 applies a predetermined image process to the digital image signal, and outputs image data. The control unit 102 displays an image corresponding to the image data concerned on the display unit 115 in a live view.

When a shutter button of the operation unit 101 is half-pressed (a switch SW1 turns ON), the control unit 102 performs an AF process and an AE process according to the image data at the ON timing of SW1 to find the optimal focus for photographing and an exposure setting condition (they are collectively called photographing conditions). Furthermore, the control unit 102 determines at the ON timing of SW1 whether the flash unit 111 will be used to emit light.

In the case where it is determined that the flash unit 111 will not be used to emit light, the control unit 102 will shift to a main photographing when the shutter button is fully pressed (a switch SW2 turns ON). Then, the control unit 102 controls the AE processing unit 109 and the AF processing unit 108 according to the photographing conditions set up at the ON timing of SW1. The control unit 102 reads the electric charge accumulated in the sensor module 103 by an optical image formed on the sensor module 103 through the lens 108a and the mechanical structure 109a, and outputs it as an analog image signal to the A/D convertor 104.

The A/D convertor 104 outputs a digital image signal corresponding to the analog image signal. The image processing unit 105 applies the predetermined image process to the digital image signal, and outputs it as image data. Then, the image data concerned is recorded in a storage medium with the image recording unit 113 under the control of the control unit 102.

On the other hand, in the case where it is determined that the flash unit 11 will be used to emit light, the control unit 102 shifts to the main photographing when the switch SW2 turns ON. Then, the control unit 102 controls the AE processing unit 109 and the AF processing unit 108 according to the photographing conditions set up at the ON timing of SW1. In this case, the control unit 102 obtains a non-emission image without making the flash unit 111 emit light.

Subsequently, the control unit 102 controls the EF processing unit 110 so as to make the flash unit 111 pre-emit light by a predetermined light amount, and obtains a pre-emission image. Then, the control unit 102 computes a main emission amount that is necessary to obtain a target luminance value in an object image at the time of the main emission according to the luminance difference between the pre-emission image and the non-emission image. This point will be mentioned later.

After computing the main emission amount, the control unit 102 photographs with the main emission. In this case, the control unit 102 controls the EF processing unit 110 to make the flash unit 111 emit light by the main emission amount. Then, the analog image signal output from the sensor module 103 is converted into the digital image signal with the A/D convertor 104 as mentioned above. The image processing unit 105 generates the image data (i.e., a main image) according to the digital image signal. Next, the encoder unit 112 converts the main image into compressed image data in the JPEG format etc. under the control of the control unit 102. The image recording unit 113 records the compressed image data concerned in the storage medium.

Figure 3:
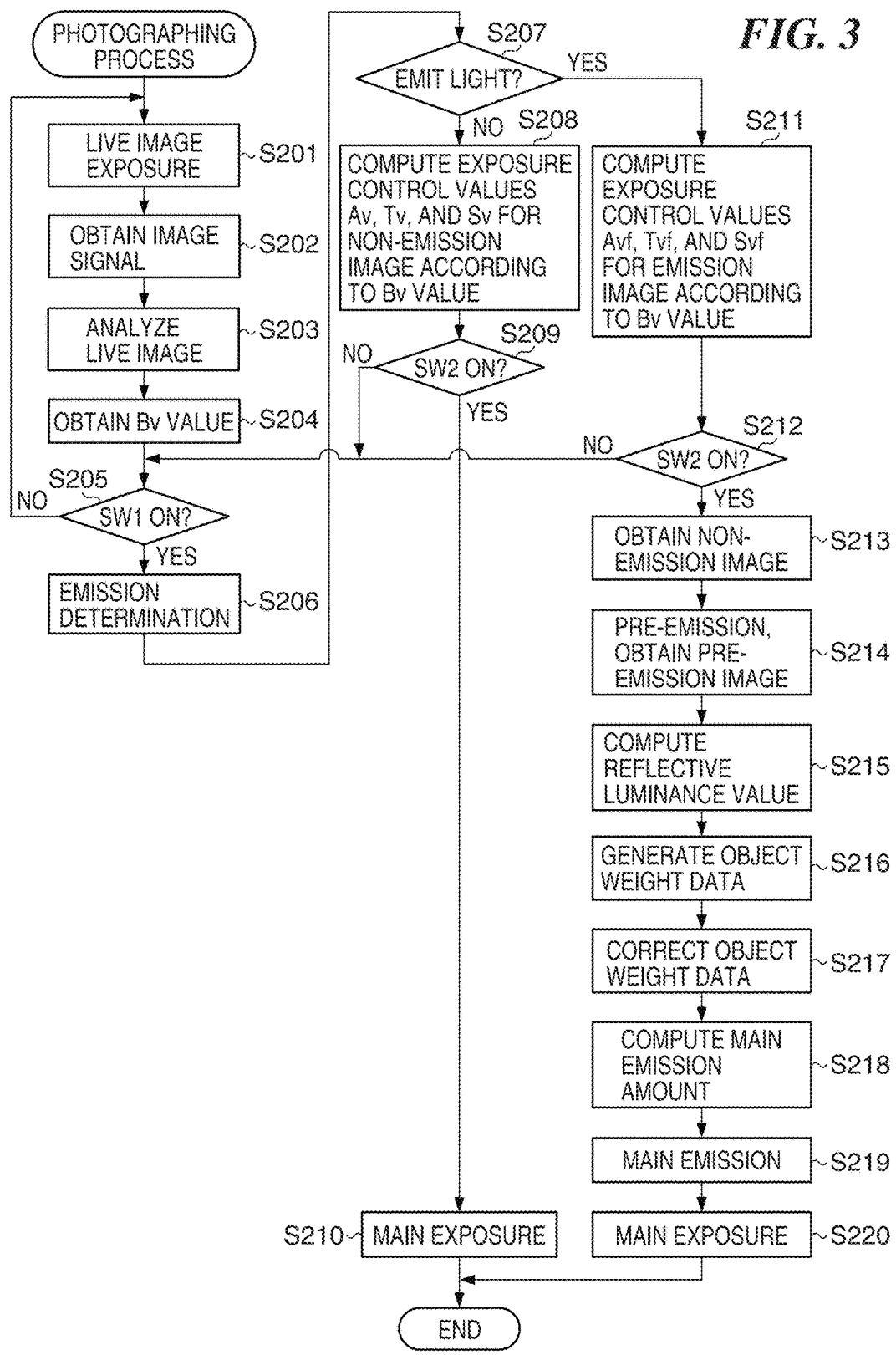
FIG. 3 is a flowchart showing a photographing process performed by the camera shown in FIG. 1.

FIG. 3 is a flowchart showing a photographing process performed by the camera shown in FIG. 1.

When the power of the camera is turned ON, the control unit 102 sets up an initial exposure control value first, and starts exposure for obtaining a live image (step S201). Then, the control unit 102 obtains image data (i.e., a live image) according to the analog image signal output from the sensor module 103 with the image processing unit 105 (obtain image signal: step S202).

Subsequently, the control unit 102 analyzes the live image (step S203), and computes the luminance value Bv in the live image (step S204). In this case, the control unit 102 divides the live image into the predetermined number of block areas, and computes a block average luminance value by integrating luminance values of pixels for every block area.

Next, the control unit 102 determines whether the switch SW1 turns ON (step S205). When the switch SW1 is OFF (NO in the step S205), the control unit 102 returns the process to the step S201. On the other hand, when the switch SW1 turns ON (YES in the step S205), the control unit 102 performs an emission determination to determine whether the flash unit 111 is used to emit light on the basis of the live image (step S206). Then, the control unit 102 determines whether the flash unit 111 is used to emit light (step S207).

When it is determined that the flash unit 111 is not used to emit light (NO in the step S207), the control unit 102 computes the exposure control values for a non-emission image (an aperture value Av, a shutter speed Tv, and an ISO speed Sv) according to the above-mentioned luminance value Bv (step S208). It should be noted that the exposure control values (the ISO speed Sv, the aperture value Av, and the shutter speed Tv) for a non-emission image are determined so that an image obtained as a result of photographing will have a target luminance. A user is able to change the target luminance by operating an exposure correction button of the operation unit 101.

Subsequently, the control unit 102 determines whether the switch SW2 turns ON (step S209). When the switch SW2 is OFF (NO in the step S209), the control unit 102 returns the process to the step S205. On the other hand, when the switch SW2 turns ON (YES in the step S209), the control unit 102 performs the main exposure by the exposure control values for a non-emission image (photographing: step S210). Then, the control unit 102 finishes the photographing process.

When it is determined that the flash unit 111 is used to emit light (YES in the step S207), the control unit 102 computes the exposure control values for an emission image (an aperture value Avf, a shutter speed Tvf, and an ISO speed Svf) according to the above-mentioned luminance value Bv (step S211).

Subsequently, the control unit 102 determines whether the switch SW2 turns ON (step S212). When the switch SW1 is OFF (NO in the step S212), the control unit 102 returns the process to the step S205. On the other hand, when the switch SW2 turns ON (YES in the step S212), the control unit 102 will shift to a flash emission photographing.

In the flash emission photographing, the control unit 102 obtains a non-emission image first without making the flash unit 111 emit light in order to compute a required emission amount (step S213). After that, the control unit 102 makes the flash unit 111 emit light by the predetermined emission amount (pre-emission), and obtains a pre-emission image (step S214).

In this embodiment, the exposure control values used for obtaining a non-emission image are identical to the exposure control values used for obtaining a pre-emission image in order to facilitate the calculation of the reflected light data of the pre-emission. It should be noted that the exposure control values used for obtaining a non-emission image may not be identical to the exposure control values used for obtaining a pre-emission image. In that case, a luminance value of a block area in the non-emission image or a luminance value of a block area in the pre-emission image may be corrected so as to compensate the difference between the exposure control values.

FIG. 4A through FIG. 4E are views for describing a calculation method of a reflective luminance value that is reflected light data of the pre-emission performed with the camera shown in FIG. 1. Then, FIG. 4A is a view showing an example of a non-emission image, and FIG. 4B is a view showing luminance values of the block areas in the non-emission image. Moreover, FIG. 4C is a view showing an example of a pre-emission image, and FIG. 4D is a view showing luminance values of the block areas in the pre-emission image. Furthermore, FIG. 4E is a view showing reflective luminance values of object areas.

The control unit 102 divides each of a non-emission image and a pre-emission image into the predetermined number of block areas. In the following description, a block area in a non-emission image is referred to as a non-emission block, and a block area in a pre-emission image is referred to as a pre-emission block.

In the example shown in FIG. 4A and FIG. 4C, the non-emission image and the pre-emission image are respectively divided into the non-emission blocks of 36 pieces and the pre-emission blocks of 36 pieces. The control unit 102 finds a luminance value for every non-emission block and every pre-emission block as mentioned above (see FIG. 4B and FIG. 4D).

Subsequently, the control unit 102 finds a difference (a differential luminance value) between the luminance value of the non-emission block and the luminance value of the corresponding pre-emission block, and regards the differential luminance value concerned as the reflective luminance value.

Thus, the reflective luminance value is computed on the basis of the non-emission image and the pre-emission image (step S215).

Next, the control unit 102 refers the reflective luminance values and regards a block area of which the reflective luminance value is equal to or more than a predetermined luminance value (one or more in the case in FIG. 4E) as an object area (a light-control target area). Then, the object weight operation unit 116 generates object weight data (first weighting data) used in a light control operation (step S216) by extracting weights of the object areas from default weights of a centrally weighted manner (it is also called centrally weighted weights) under the control of the control unit 102.

FIG. 5A and FIG. 5B are views for describing the generation of the object weight data performed with the camera shown in FIG. 1. Then, FIG. 5A is a view showing an example of distribution of centrally weighted weights, and FIG. 5B is a view showing an example of distribution of object weights.

The centrally weighted weights shown in FIG. 5A are beforehand set in the object weight operation unit 116. In the centrally weighted manner, the weights in the center portion of an image (i.e., a screen) are larger, and the weights decrease according to a distance from the center portion (towards the peripheral portion) step by step.

The object weight operation unit 116 generates the object weight data shown in FIG. 5B by reading the weights of the areas corresponding to the object areas from the centrally weighted weights shown in FIG. 5A. The weights of block areas other than the object areas are set to zero in the object weight data. The object weight operation unit 116 selects a block area of which weight is not zero as a target area that is used for determining the emission amount of the emission unit, and does not select a block area of which weight is zero as a target area that is used for determining the emission amount of the emission unit, under the control of the control unit 102.

Figure 6A:
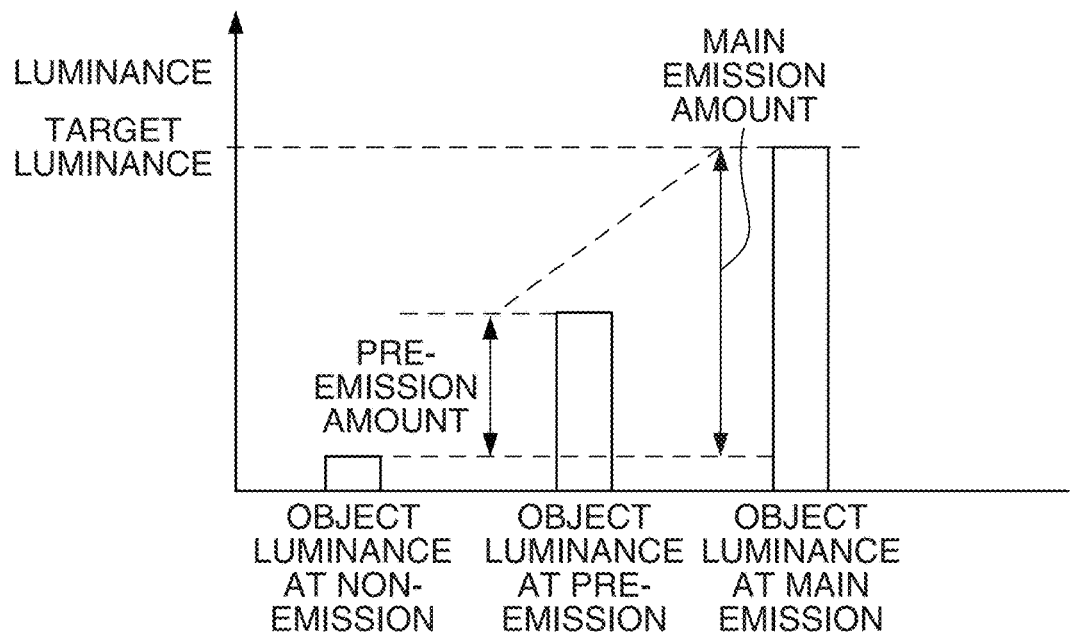
FIG. 6A is a graph showing a regular emission amount operation performed with the camera shown in FIG. 1.
Figure 6B:
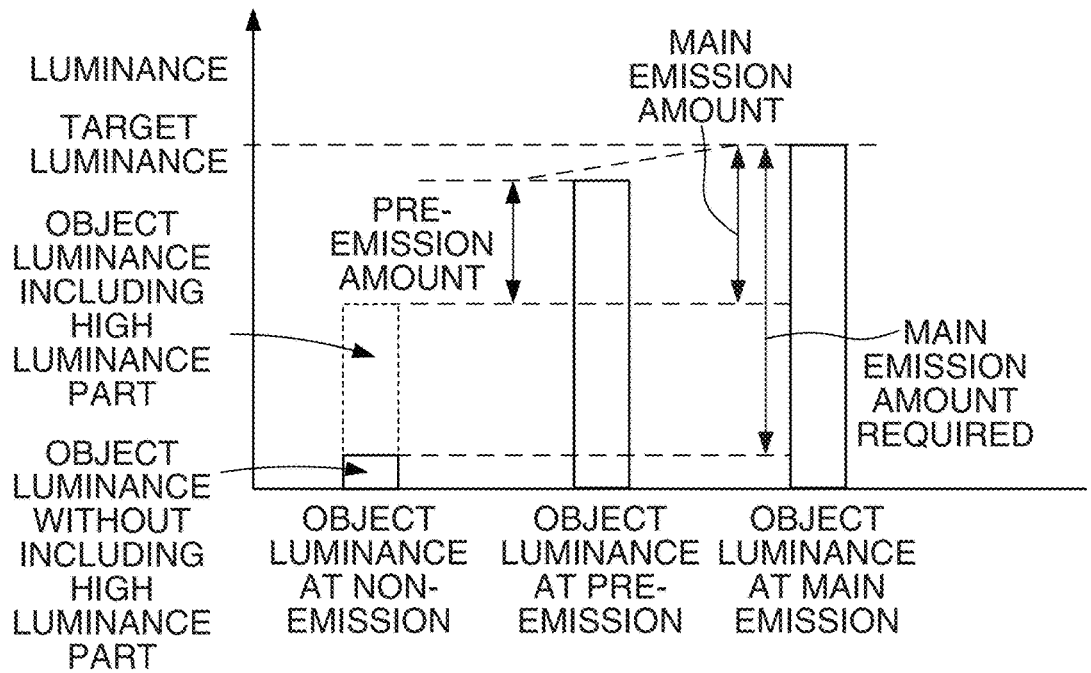
FIG. 6B is a graph showing the regular emission amount operation performed about an image of which an object area includes a high luminance part.

FIG. 6A is a view showing a regular emission amount operation performed with the camera shown in FIG. 1. FIG. 6B is a view showing the regular emission amount operation performed about an image of which an object area includes a high luminance part.

In the regular photographing, an emission amount operation (i.e., a light control operation) is performed so that the weighted mean of the luminance values of the object areas that are subjected to the weighted operation using the object weight data approaches the target luminance value. As shown in FIG. 6A, the emission amount corresponding to the differential luminance value between the pre-emission image and the non-emission image is regarded as the pre-emission amount, and the main emission amount required to obtain the target luminance value in the object area is found on the basis of the pre-emission amount and the luminance values of the object areas in the pre-emission image.

At this time, the emission amount that corresponds to the difference between the target luminance value and the object luminance value in the non-emission image is regarded as the main emission amount.

Figures 7A, 7B, 7C:
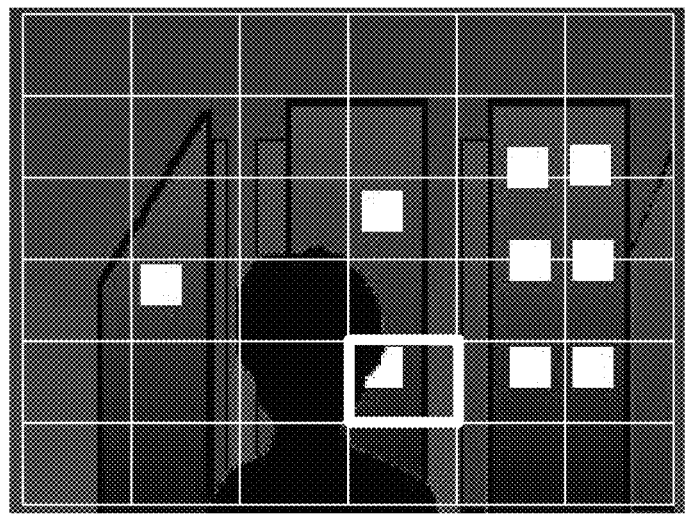
FIG. 7A is a view showing an example of a non-emission image when a high luminance part is in a background.
FIG. 7B is a view showing the object weights in the non-emission image shown in FIG. 7A.
FIG. 7C is a view showing the luminance values of the block areas in the non-emission image (non-emission blocks) shown in FIG. 7A.

FIG. 7A is a view showing an example of a non-emission image when a high luminance part is in a background. FIG. 7B is a view showing the object weights in the non-emission image shown in FIG. 7A. FIG. 7C is a view showing the luminance values of the block areas in the non-emission image (non-emission blocks) shown in FIG. 7A.

In the photographing scene shown in FIG. 7A, a high luminance part exists near the object in the background. In such a situation, the luminance value of the non-emission block corresponding to the high luminance part included in the object area becomes high, as shown in FIG. 7C. Then, if the light control operation is performed using the object weights shown in FIG. 7B, the luminance values of the object areas in the non-emission image become high because the object area includes the high luminance part. And if the main emission amount is computed on the basis of the luminance values including the high luminance value due to the high luminance part, the luminance of the object does not reach the target luminance.

That is, when the object area includes the high luminance part, the object luminance value is computed on the basis of the luminance values of all the object areas including the object area that includes the high luminance part, as shown in FIG. 6B. Then, the emission amount corresponding to the differential luminance value between the pre-emission image and the non-emission image is regarded as the pre-emission amount, and the main emission amount required to obtain the target luminance value is found on the basis of this pre-emission amount and the luminance values of the object areas in the pre-emission image. In this case, the emission amount corresponding to the difference between the target luminance value and the object luminance value in the non-emission image (the object luminance values of all the object areas including the high luminance part) is regarded as the main emission amount. As a result, the computed main emission amount will become lower than the main emission amount required essentially.

In order to avoid such a defect, in the embodiment, the main emission amount is controlled so that the object luminance reaches the target luminance at the time of the main emission even when the object area includes a high luminance part by lower setting the weight of the non-emission block of which the luminance value is higher than the weighted mean luminance value of the object areas in the non-emission image by the predetermined luminance difference or more. Specifically, a weighting coefficient α ($0 \leq \alpha \leq 1$) is set to an object area in the non-emission image according to a luminance value to control a weight.

Figure 8A:
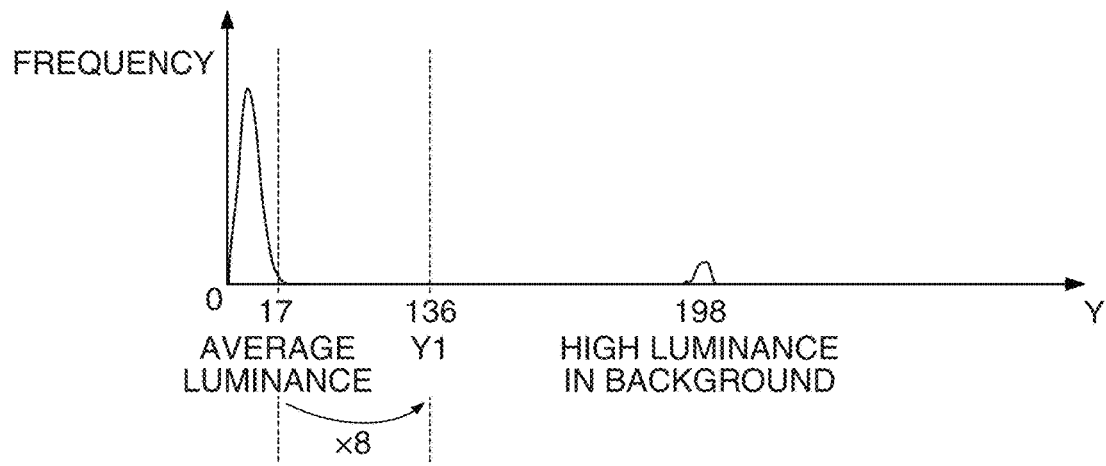
FIG. 8A and FIG. 8B are views for describing calculation of final object weight data performed with the camera shown in FIG. 1.
Figure 8B:
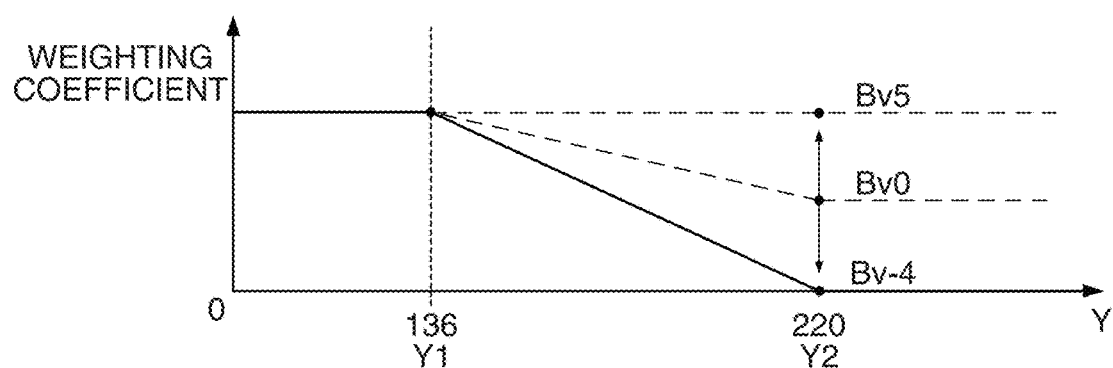

FIG. 8A and FIG. 8B are views for describing computation of object weight data (second weighting data) performed with the camera shown in FIG. 1. FIG. 8A is a graph showing an example of distribution of a luminance value Y in a non-emission image, and FIG. 8B is a graph showing a relation between the luminance value Y and the weighting coefficient α.

In the luminance distribution shown in FIG. 8A, the high luminance part exists in the background and the luminance values of the high luminance part concentrate near "198". Moreover, the weighted mean luminance value of the object areas in the non-emission image that is computed using the object weight data shown in FIG. 7B shall be "17" in the luminance distribution shown in FIG. 8A.

In such a case, the control unit 102 regards the luminance value Y1 (here the luminance value "136") that is obtained by multiplying the weighted mean luminance value by the predetermined number of steps (for example, the number of steps "8") as a starting point of change of the weighting coefficient α (i.e., the weighting coefficient α=1.0 within a range of $0 \leq Y \leq Y1$, see FIG. 8B). The value multiplied to the weighted mean luminance value when determining the luminance value Y1 is not limited to "8". The value may be changed according to a photographing scene or a photographing mode. Moreover, the luminance value Y1 as the starting point of change may be a predetermined fixed value that is not determined on the basis of the weighted mean luminance value of the object areas in the non-emission image that is computed using the object weight data.

Then, the control unit 102 generates a coefficient attenuation table in which the starting point is the luminance value "136" and an end point is a luminance value Y2 (the luminance value "220") that is a threshold to determine whether whiteout occurs. The luminance value Y2 is equivalent to a luminance value of neon or of a point light source in night view, for example.

Moreover, the frequency that neon or a point light source exists is low in a daytime-photographing scene with a bright extraneous light. That is, a high luminance part in the daytime-photographing scene has a high possibility of being a part of an object. Accordingly, an attenuation factor of the weighting coefficient α is changed so that the attenuation factor (a rate of change) increases as the luminance value Bv of the extraneous light decreases.

In the example shown in FIG. 8B, when the luminance value Bv of the extraneous light is "5", the attenuation factor is set to zero. Moreover, when the luminance value Bv of the extraneous light is "0", the attenuation factor is set up so that weighting coefficient α becomes "0.5" at the end point. When the luminance value Bv of the extraneous light is "−4", the attenuation factor is set up so that the weighting coefficient α becomes zero at the end point.

Although the weighting coefficient α varies linearly in the coefficient attenuation table shown in FIG. 8B, a coefficient attenuation table in which the weighting coefficient varies step by step or a coefficient attenuation table in which the weighting coefficient varies nonlinearly may be employed.

Figure 9:
FIG. 9 is a view showing an example of a non-emission image photographed in a backlight scene.

Next, a photographing in a backlight scene will be described. FIG. 9 is a view showing an example of a non-emission image photographed in a backlight scene.

In a backlight scene, although an average brightness of the whole screen is high because a bright part exists in a background, an object becomes dark (see FIG. 9). Accordingly, it is preferable to make the flash unit 111 emit light and to photograph an object brightly in a backlight scene. In this case, for example, the control unit 102 regards an average of luminance values of block areas including a face part obtained by detecting a face of an object (face detection) in a non-emission image as an object luminance value. Then, the control unit 102 regards block areas outside the block areas including the face part as background areas, and regards the average luminance value in the background areas as a background luminance value.

FIG. 10 is a view for describing a backlight-scene determination process performed with the camera shown in FIG. 1.

A first threshold TH1 and a second threshold TH2 that is larger than the first threshold concerned are set in the control unit 102. The control unit 102 determines that the photographing scene concerned is a backlight scene when the above-mentioned object luminance value is equal to or less than the first threshold TH1 and the background luminance value is equal to or more than the second threshold TH2. When the control unit 102 determines to be the backlight scene, the attenuation factor of the weighting coefficient α shown in FIG. 8B is increased as the difference between the object luminance value and the background luminance value increases.

With reference to FIG. 3, the object weight operation unit 116 determines the weighting coefficient α for each of the block areas that are the object areas on the basis of the luminance value of each block area included in the object areas in the non-emission image under the control of the control unit 102. Then, the object weight operation unit 116 corrects the object weight data generated in the step S216 by multiplying the determined weighting coefficient α, and finds the last object weight data (second weighting data) (step S217). Next, the control unit 102 computes the main emission amount that makes the light-control target area be proper exposure with reference to the last object weight data as mentioned above (step S218).

Subsequently, the control unit 102 controls the EF processing unit 110 so as to make the flash unit 111 emit light by the main emission amount (step S219). Furthermore, the control unit 102 controls the AF processing unit 108 and the AE processing unit 109 to perform main exposure (to perform photographing: step S220). Then, the control module 102 finishes the photographing process.

Thus, since the object weight data is corrected using the weighting coefficient α in the embodiment of the present invention, the emission amount corresponding to the brightness of the object is found even if the high luminance part existed in the background.

As is clear from the above description, the control unit 102 functions as a selecting unit and a determination unit, and the control unit 102 and the object weight operation unit 116 function as a first weighting unit and a second weighting unit in the example shown in FIG. 1. Furthermore, the control unit 102 and the EF processing unit 110 function as a control unit.

Moreover, the lens 108a, the mechanical structure 109a, the sensor module 103, the A/D convertor 104, and the image processing unit 105 function as an image pickup unit, and the control unit 102 and the image recording unit 113 function as a recording unit. It should be noted that at least the control unit 102, the object weight operation unit 116, the AE processing unit 109, and the WF processing unit 110 constitute a light emission control device.

The functions of the above mentioned embodiment may be achieved as a control method that is executed by a light emission control device. Moreover, the functions of the above mentioned embodiment may be achieved as a control program that is executed by a computer with which the light emission control device is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-014172, filed Jan. 28, 2015, which is hereby incorporated by reference herein in its entirety.

What is claimed is:

1. A light emission control device comprising:
a selecting unit configured to divide each of a non-emission image obtained by photographing an object without making an emission unit emit light and a pre-emission image obtained by photographing the object while making the emission unit emit light with a predetermined light amount into a predetermined number of block areas, and to select at least one block area in the non-emission image as at least one light-control target area according to a difference between a luminance value of a block area in the non-emission image and a luminance value of a corresponding block area in the pre-emission image;
a first weighting unit configured to generate first weighting data by allocating a predetermined weight to each of the at least one light-control target area;
a second weighting unit configured to obtain a weighting coefficient for each of the at least one light-control target area in the non-emission image, and to generate second weighting data by multiplying the first weighting data by the weighting coefficient;
a control unit configured to control the emission unit according to a main emission amount determined with reference to the second weighting data; and
a determination unit configured to determine whether a photographing scene is a backlight scene,
wherein said second weighting unit decreases the weighting coefficient as the luminance value of the block area that is equal to or more than a predetermined luminance value increases, and
wherein said determination unit determines that a photographing scene is a backlight scene when the luminance value of the at least one light-control target area is equal to or less than a predetermined first threshold and when the luminance value of background areas that are block areas except the at least one light-control target area is equal to or more than a second threshold that is more than the first threshold.

2. The light emission control device according to claim 1, wherein said second weighting unit minimizes the weighting coefficient at the luminance value at which whiteout occurs.

3. The light emission control device according to claim 1, wherein said second weighting unit decreases the weighting coefficient as extraneous light at time of photographing becomes dark.

4. The light emission control device according to claim 1, wherein said second weighting unit changes a rate of change of the weighting coefficient when said determination unit determines that a photographing scene is a backlight scene.

5. The light emission control device according to claim 1, wherein said second weighting unit increases the rate of change of the weighting coefficient as the difference between the luminance value of the at least one light-control target area and the luminance value of the background areas becomes large.

6. The light emission control device according to claim 1, wherein said control unit obtains the main emission amount so that an average of the luminance values of the light-control target areas in the non-emission image that are weighted by the second weighting data approaches the target luminance value, and controls the emission unit according to the main emission amount.

7. An image pickup apparatus comprising:
an image pickup unit configured to photograph an object to obtain an image;
a light emission control device comprising:
a selecting unit configured to divide each of a non-emission image obtained by photographing an object without making an emission unit emit light and a pre-emission image obtained by photographing the object while making the emission unit emit light with a predetermined light amount into a predetermined number of block areas, and to select at least one block area in the non-emission image as at least one light-control target area according to a difference between a luminance value of a block area in the non-emission image and a luminance value of a corresponding block area in the pre-emission image;
a first weighting unit configured to generate first weighting data by allocating a predetermined weight to each of the at least one light-control target area;
a second weighting unit configured to obtain a weighting coefficient for each of the at least one light-control target area in the non-emission image, and to generate second weighting data by multiplying the first weighting data by the weighting coefficient;
a control unit configured to obtain the main emission amount so that an average of the luminance values of the light-control target areas in the non-emission image that are weighted by the second weighting data approaches the target luminance value, and to control the emission unit according to the main emission amount;
a recording unit configured to record an image, which is obtained by photographing the object with said image pickup unit while making the emission unit emit light by the main emission amount, into a storage medium; and
a determination unit configured to determine whether a photographing scene is a backlight scene,
wherein said second weighting unit decreases the weighting coefficient as the luminance value of the block area that is equal to or more than a predetermined luminance value increases, and
wherein said determination unit determines that a photographing scene is a backlight scene when the luminance value of the at least one light-control target area is equal to or less than a predetermined first threshold and when the luminance value of background areas that are block areas except the at least one light-control target area is equal to or more than a second threshold that is more than the first threshold.

8. A control method for a light emission control device, the control method comprising:
dividing each of a non-emission image obtained by photographing an object without making an emission unit emit light and a pre-emission image obtained by photographing the object while making the emission unit emit light with a predetermined light amount into a predetermined number of block areas, and of selecting at least one block area in the non-emission image as at least one light-control target area according to a difference between a luminance value of a block area in the non-emission image and a luminance value of a corresponding block area in the pre-emission image;

generating first weighting data by allocating a predetermined weight to each of the block area included in the light-control target area;

obtaining a weighting coefficient for each of the block area included in the light-control target area in the non-emission image, and of generating second weighting data by multiplying the first weighting data by the weighting coefficient;

controlling the emission unit according to a main emission amount determined with reference to the second weighting data; and determining whether a photographing scene is a backlight scene, wherein the weighting coefficient is decreased as the luminance value of the block area that is equal to or more than a predetermined luminance value increases, and wherein a photographing scene is determined as a backlight scene when the luminance value of the at least one light-control target area is equal to or less than a predetermined first threshold and when the luminance value of background areas that are block areas except the at least one light-control target area is equal to or more than a second threshold that is more than the first threshold.

9. A non-transitory computer-readable storage medium storing a control program causing a computer to execute a control method for a light emission control device, the control method comprising:

dividing each of a non-emission image obtained by photographing an object without making an emission unit emit light and a pre-emission image obtained by photographing the object while making the emission unit emit light with a predetermined light amount into a predetermined number of block areas, and of selecting at least one block area in the non-emission image as at least one light-control target area according to a difference between a luminance value of a block area in the non-emission image and a luminance value of a corresponding block area in the pre-emission image;

generating first weighting data by allocating a predetermined weight to each of the block area included in the light-control target area;

obtaining a weighting coefficient for each of the block area included in the light-control target area in the non-emission image, and of generating second weighting data by multiplying the first weighting data by the weighting coefficient;

controlling the emission unit according to a main emission amount determined with reference to the second weighting data; and determining whether a photographing scene is a backlight scene, wherein the weighting coefficient is decreased as the luminance value of the block area that is equal to or more than a predetermined luminance value increases, and wherein a photographing scene is determined as a backlight scene when the luminance value of the at least one light-control target area is equal to or less than a predetermined first threshold and when the luminance value of background areas that are block areas except the at least one light-control target area is equal to or more than a second threshold that is more than the first threshold.

* * * * *